(12) United States Patent
Nakamura

(10) Patent No.: US 9,100,517 B2
(45) Date of Patent: Aug. 4, 2015

(54) INFORMATION PROCESSING SYSTEM, MANAGEMENT DEVICE, MANAGEMENT METHOD, AND STORAGE MEDIUM

(71) Applicant: CANON KABUSHIKI KAISHA, Tokyo (JP)

(72) Inventor: Tadahiro Nakamura, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 100 days.

(21) Appl. No.: 13/716,335

(22) Filed: Dec. 17, 2012

(65) Prior Publication Data

US 2013/0163020 A1 Jun. 27, 2013

(30) Foreign Application Priority Data

Dec. 21, 2011 (JP) ................................. 2011-279337

(51) Int. Cl.
| | | |
|---|---|---|
| G06F 3/12 | (2006.01) | |
| H04N 1/00 | (2006.01) | |
| G06F 3/00 | (2006.01) | |

(52) U.S. Cl.
CPC ....... *H04N 1/00278* (2013.01); *H04N 1/00344* (2013.01); *H04N 1/00347* (2013.01); *H04N 1/00973* (2013.01); *H04N 2201/0082* (2013.01); *H04N 2201/0093* (2013.01)

(58) Field of Classification Search
CPC .......... H04N 1/00278; H04N 1/00973; H04N 2201/0093; H04N 1/00347; H04N 1/00344; H04N 2201/0082
See application file for complete search history.

(56) References Cited

U.S. PATENT DOCUMENTS 7,327,482 B2 * 2/2008 Ferlitsch ...................... 358/1.15
8,019,904 B2 * 9/2011 Iizuka .............................. 710/8

FOREIGN PATENT DOCUMENTS

| JP | 2007-130838 A | | 5/2007 |
|---|---|---|---|
| JP | 2007130838 A | * | 5/2007 |
| JP | 2008-153943 A | | 7/2008 |

* cited by examiner

*Primary Examiner* — Ashish K Thomas
*Assistant Examiner* — Neil R McLean
(74) *Attorney, Agent, or Firm* — Carter, DeLuca, Farrell & Schmidt, LLP

(57) ABSTRACT

A set value management service updates virtual configuration data of an image forming apparatus, returns a response including a notification instruction that instructs image forming apparatus to notify surrounding image forming apparatus that virtual configuration data has been updated in response to virtual configuration data acquisition request from the image forming apparatus. The image forming apparatus performs an update notification indicating that virtual configuration data has been updated to the surrounding image forming apparatus in response to the notification instruction included in the response. Then, the surrounding image forming apparatus that received the notification performs virtual configuration data acquisition request to the set value management service.

7 Claims, 14 Drawing Sheets

FIG. 4

| Identifier number | Setting value identifier | Value |
|---|---|---|
| 11 | copy_settings.nup | 2in1 |
| 21 | device_settings.sleep_time | 10 minutes |
| 101 | fax_settings.received_print | OFF |
| 151 | box_settings.server_address | "http://192.168.1.1/server/" |
| 161 | network_settings.host_name | "" |
| 162 | network_settings.domain_name | "" |
| 163 | device_settings.cloud_address | "http://ddd.com/config" |

FIG. 5A

| Identifier number | Setting value identifier | Value |
|---|---|---|
| 11 | copy_settings.nup | 2in1 |
| 21 | device_settings.sleep_time | 10 minutes |
| 101 | fax_settings.received_print | OFF |
| 151 | box_settings.server_address | "http://192.168.1.1/server/" |
| 161 | network_settings.host_name | "" |
| 162 | network_settings.domain_name | "" |

FIG. 5B

| Identifier number | Setting value identifier | Value |
|---|---|---|
| 11 | copy_settings.nup | 2in1 |
| 21 | device_settings.sleep_time | 10 minutes |
| 101 | fax_settings.received_print | ON |
| 151 | box_settings.server_address | "http://192.168.1.1/server/" |
| 161 | network_settings.host_name | "" |
| 162 | network_settings.domain_name | "" |

FIG. 5C

| Identifier number | Setting value identifier | Value |
|---|---|---|
| 11 | copy_settings.nup | 2in1 |
| 21 | device_settings.sleep_time | 10 seconds |
| 101 | fax_settings.received_print | ON |
| 161 | network_settings.host_name | "" |
| 162 | network_settings.domain_name | "" |

FIG. 6A

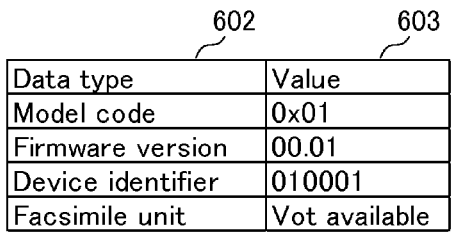

| Data type | Value |
|---|---|
| Model code | 0x01 |
| Firmware version | 00.01 |
| Device identifier | 010001 |
| Facsimile unit | Vot available |

FIG. 6B

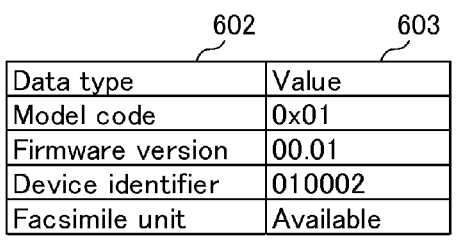

| Data type | Value |
|---|---|
| Model code | 0x01 |
| Firmware version | 00.01 |
| Device identifier | 010002 |
| Facsimile unit | Available |

FIG. 6C

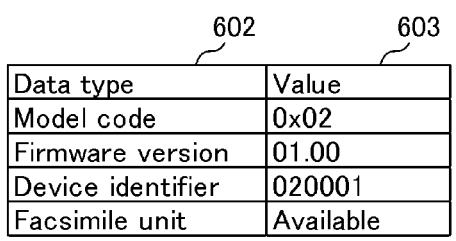

| Data type | Value |
|---|---|
| Model code | 0x02 |
| Firmware version | 01.00 |
| Device identifier | 020001 |
| Facsimile unit | Available |

FIG. 7

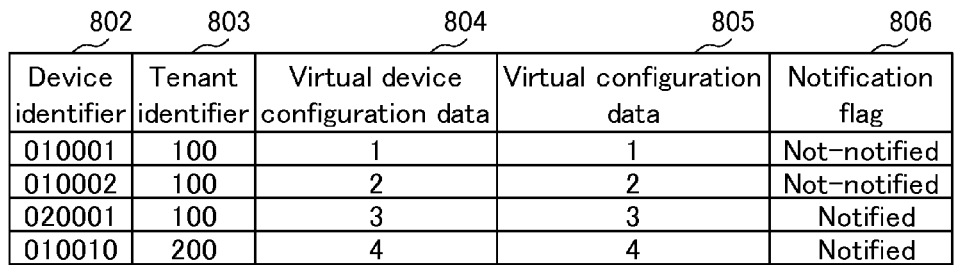

| Device identifier | Tenant identifier | Virtual device configuration data | Virtual configuration data | Notification flag |
|---|---|---|---|---|
| 010001 | 100 | 1 | 1 | Not-notified |
| 010002 | 100 | 2 | 2 | Not-notified |
| 020001 | 100 | 3 | 3 | Notified |
| 010010 | 200 | 4 | 4 | Notified |

FIG. 8A (406)

| Identifier number | Set value identifier (402) | Default value (403) | Value range (404) | Condition (405) |
|---|---|---|---|---|
| 11 | copy_settings.nup | 1in1 | 1 in 1, 2 in 1, 4 in 1 | None |
| 21 | device_settings.sleep_time | 10 minutes | 1 minute, 10 minutes, 1 hour | None |
| 101 | fax_settings.received_print | OFF | ON, OFF | Facsimile unit |
| 151 | box_settings.server_address | "" | 256 bytes | None |
| 161 | network_settings.host_name | "" | 64 bytes | None |
| 162 | network_settings.domain_name | "" | 256 bytes | None |

FIG. 8B (406)

| Identifier number | Set value identifier (402) | Default value (403) | Value range (404) | Condition (405) |
|---|---|---|---|---|
| 11 | copy_settings.nup | 1in1 | 1 in 1, 2 in 1, 4 in 1 | None |
| 21 | device_settings.sleep_time | 10 seconds | 10 seconds, 1 minute, 10 minutes, 1 hour | None |
| 101 | fax_settings.received_print | OFF | ON, OFF | Facsimile unit |
| 161 | network_settings.host_name | "" | 64 bytes | None |
| 162 | network_settings.domain_name | "" | 256 bytes | None |

FIG. 9 (505)

| Identifier number | Set value identifier (502) | Value (503) | Notification instruction flag (504) |
|---|---|---|---|
| 11 | copy_settings.nup | 2 in 1 | Notified |
| 21 | device_settings.sleep_time | 10 seconds | Notified |
| 101 | fax_settings.received_print | ON | Not-notified |
| 151 | box_settings.server_address | "http://192.168.1.1/server/" | Notified |
| 161 | network_settings.host_name | "" | Notified |
| 162 | network_settings.domain_name | "" | Notified |

FIG. 16

```
<notifyUpdate>
  <datetime>2011/1/1 12:00:00</datetime>
  <changed_data>
    <id>101</id>
     .
     .
  </changed_data>
</notifyUpdate>
```
} 1701

FIG. 17

```
<getConfigDataResponse>
  <config_data>
    <fax_group>
      <item>
        <id>101</id>
        <name>fax.setting.received_print</name>
        <value>0</value>
      </item>
       .
       .
    </fax_group>
  </config_data>
  <extend_operation>
    <notify_update>true</notify_update>
  </extend_operation>
</getConfigDataResponse>
```
} 1601
} 1602

INFORMATION PROCESSING SYSTEM, MANAGEMENT DEVICE, MANAGEMENT METHOD, AND STORAGE MEDIUM

BACKGROUND OF THE INVENTION

1. Field of the Invention

The present invention relates to an information processing system a management method, and a storage medium.

2. Description of the Related Art

There has been proposed an image forming apparatus that stores configuration data in a storage unit. The configuration data is setting information (operation setting information) for switching the operation of the image forming apparatus. Since configuration data is stored in the storage unit provided in each of the image forming apparatuses, the setting changes in configuration data need to be made by the number of image forming apparatuses in order to change configuration data for all of the image forming apparatuses.

For saving the time and required for changing the settings of configuration data by the number of image forming apparatuses, there has been proposed a technology in which the settings of configuration data for a plurality of image forming apparatuses are made at one time by a certain information processing apparatus. For example, Japanese Patent Laid-Open No. 2007-130838 discloses an image forming system in which a plurality of image forming apparatuses, to which the initial setting operation has been performed, downloads initial system setting information from a server and reflects the downloaded initial system setting information to the initial setting content.

Also, Japanese Patent Laid-Open No. 2008-153943 discloses a method for notifying a start of distribution of configuration data from a server to an image forming apparatus, requiring distribution of configuration data from the image forming apparatus to the server when new configuration data has not been distributed when the use uses the image forming apparatus after the start of distribution.

Also, it is contemplated that the server (a management device) located on the Internet holds configuration data performs setting in a collective manner without limitation about physical position in which the image forming apparatus is placed. Note that a firewall is generally located between an intranet on which the image forming apparatus is placed and the Internet on which the server is placed. Since a firewall rejects a connection from the Internet to the intranet, the firewall has a communication configuration in which the image forming apparatus connects to the server so as to acquire configuration data when the server is placed on the Internet.

Configuration data of the image forming apparatus is generally retained and much less changed during operation of the image forming apparatus after being placed once the image forming apparatus has been newly placed and its configuration data is set. Thus, when configuration data is managed such as by the server on the Internet, regular polling of configuration data by the image forming apparatus causes unnecessary communication network load. Therefore, for reducing such unnecessary communication traffic, a structure in which the image forming apparatus acquires configuration data when the image forming apparatus activates is general.

However, there may be an image forming apparatus rarely performs the power OFF/ON depending on the circumstance of usage. As a result, such image forming apparatus has less and less opportunity to acquire configuration data, the configuration data is not reflected on the image forming apparatus over a long period even if the configuration data is changed on the management device, and thus continues the operation with old setting configuration data. In addition, when there may be other image forming apparatus that has configuration data associated with a setting of changed configuration data corresponding to certain image forming apparatus, the other image forming apparatus needs to promptly acquire configuration data. However, when applying prior art, the other image forming apparatus has to continue the operation with the old setting.

SUMMARY OF THE INVENTION

The information processing system of the present invention makes each image forming apparatus promptly acquire a setting of operation setting information changed on the management device that manages operation setting information of the image forming apparatus, wherein the each image forming apparatus relates to the setting.

According to an aspect of the present invention, an information processing system is provided that includes an image forming apparatus and a management apparatus that manages operation setting information for switching the operation of an image forming apparatus. The management device includes an updating unit configured to update the operation setting information of the image forming apparatus; a transmitting unit configured to receive an acquisition request of the updated operation setting information of the image forming apparatus from the image forming apparatus, and transmit the updated operation setting information of the image forming apparatus to the image forming apparatus; and a notification instructing unit configured to instruct the image forming apparatus that is an acquisition request source of the operation setting information to notify other image forming apparatus different from the acquisition request source that the operation setting information has been updated. The image forming apparatus includes a requesting unit configured to transmit an acquisition request of the updated operation setting information of the own apparatus to the management device, and receive the updated operation setting information and the notification instruction from the management device as a response to the acquisition request of the operation setting information; a notifying unit configured to notify the other image forming apparatus of an update notification indicating the operation setting information has been updated according to the received notification instruction; and a receiving unit configured to receive the update notification from other image forming apparatus, wherein the requesting unit further transmits the acquisition request of the operation setting information of the own apparatus to the management device using the update notification received by the receiving unit as a trigger.

Further features of the present invention will become apparent from the following description of exemplary embodiments with reference to the attached drawings.

BRIEF DESCRIPTION OF THE DRAWINGS

FIG. 4 is a diagram illustrating an example of actual configuration data.

FIGS. 5A to 5C are diagrams illustrating an example of virtual configuration data.

FIGS. 6A to 6C are diagrams illustrating an example of actual device configuration data.

FIG. 7 is a diagram illustrating an example of a virtual device.

FIGS. 8A and 8B are diagrams illustrating an example of a model-specific set value schema.

FIG. 9 is diagram illustrating an example of tenant configuration data.

FIG. 16 is diagram illustrating an example of an update notification message.

FIG. 17 is diagram illustrating an example of a response to virtual configuration data acquisition request.

DESCRIPTION OF THE EMBODIMENTS

Hereinafter, a description will be given of the information processing system of the present embodiment. Firstly, the terms used in the present embodiment are defined. The term "configuration data" refers to data (operation setting information) for switching the operation of an image forming apparatus. For example, configuration data corresponds to a default value for imposition of a copy job or the like. If the default value for imposition of a copy job is set to "1 in 1", one page is printed on a single sheet of paper as a result of copying. If the default value for imposition of a copy job is set to "2 in 1", two pages are printed on a single sheet of paper as a result of copying.

The term "device configuration data" refers to data indicating the configuration of a device provided in an image forming apparatus. For example, device configuration data indicates whether or not an image forming apparatus includes a facsimile unit. Examples of device configuration data include a model code for uniquely identifying the model of an image forming apparatus, a running firmware version, and the like.

The term "model-specific set value schema" refers to data for defining the schema of configuration data that is held by a specific model of an image forming apparatus. The term "schema" refers to data for defining the convention and positioning for configuration data. Examples of such a model-specific set value schema include a condition(s) for validating the set value identifier for each configuration data, the default value, the value range, and data. In the present embodiment, it is assumed that there is a difference between configuration data to be held depending on the model of an image forming apparatus and a set value schema is prepared for different models of an image forming apparatus.

Figure 1:
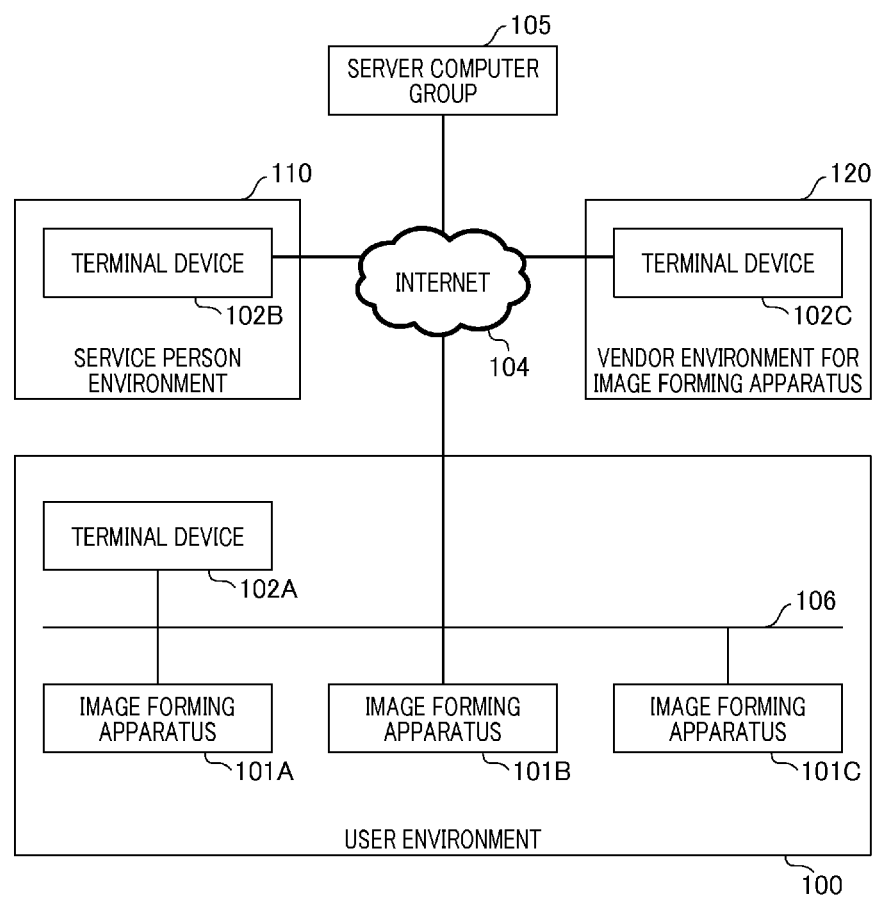
FIG. 1 is a diagram illustrating an exemplary general configuration of the present embodiment.

The term "virtual device" refers to a data group of actual devices held by a server computer group. More specifically, a virtual device includes at least device configuration data and configuration data. The term "tenant" refers to a unit of consignor to whom a user consigns the management of an image forming apparatus. In other words, a tenant is a management range of a user. The term "tenant identifier" refers to an identifier for uniquely identifying a tenant. For example, assume the case where management of image forming apparatuses 101A, 101B, and 101C in a user environment 100 (to be described below) shown in FIG. 1 is consigned by a certain company. In this case, a corresponding tenant identifier is assigned to the user environment 100 and the image forming apparatuses 101A, 101B, and 101C are recognized and managed as the image forming apparatuses belonging to the tenant.

The definition is given as follows so as to distinguish among data included in a virtual device, data held by an actual device, and data dedicated for a tenant. Device configuration data included in a virtual device is referred to as "virtual device configuration data" and configuration data included in a virtual device is referred to as "virtual configuration data". Device configuration data held by an actual device is referred to as "actual device configuration data" and configuration data held by an actual device is referred to as "actual configuration data". Also, configuration data that is commonly used in the tenant is referred to as "tenant configuration data".

FIG. 1 is a diagram illustrating an exemplary general configuration of the present embodiment. The information processing system shown in FIG. 1 includes a user environment 100, a server computer group 105, a service person environment 110, and a vendor environment 120 for image forming apparatuses. The user environment 100, the server computer group 105, the service person environment 110, and the vendor environment 120 for image forming apparatuses communicate with each other via Internet 104. The Internet 104 is a network that is capable of providing digital communication on a public line.

The user environment 100 is an environment where a user of an image forming apparatus executes the operation of the image forming apparatus. The user environment 100 includes image forming apparatuses 101A, 101B, and 101C and a terminal apparatus 102A. The image forming apparatuses 101A, 101B, and 101C are the image forming apparatuses of the present embodiment. A network 106 is a network that is capable of providing digital communication in the user environment 100. The image forming apparatuses 101A, 101B, and 101C can access the Internet 104 via the network 106. The terminal apparatus 102A is a computer that is operable by a user of the user environment 100. The terminal apparatus 102A can also access the Internet 104 via the network 106.

The service person environment 110 is an environment where a service person manages an image forming apparatus using the terminal apparatus 102B. The service person environment 110 includes a terminal apparatus 102B. The terminal apparatus 102B is a computer that is operated by a service person who manages the image forming apparatuses 101A, 101B, and 101C. The terminal apparatus 102B can access the Internet 104.

The vendor environment 120 for image forming apparatuses is an environment where management personnel of a vendor for producing an image forming apparatus performs the maintenance of data which is required for the management of an image forming apparatus. The vendor environment 120 for image forming apparatuses includes a terminal apparatus 102C. The terminal apparatus 102C is a computer that is operated by management personnel of a vendor for producing an image forming apparatus. The terminal apparatus 102C can access the Internet 104.

The server computer group 105 is a server group that provides a set value management service 310 (see FIG. 3) for managing configuration data for image forming apparatuses. The server computer group 105 provides a service to a plurality of tenants via the Internet 104. In the present embodiment, the set value management service 310 provided by the server computer group 105 functions as a management apparatus that manages configuration data for image forming apparatuses. The set value management service 310 manages image forming apparatuses by associating them with tenants that are a preset management range. In other words, the set value management service 310 manages the image forming apparatuses for each management range. In the following description, the image forming apparatuses 101A, 101B, and 101C are also described as the image forming apparatus 101 and the terminal apparatuses 102B and 102C are also described as the terminal apparatus 102.

Figure 2:
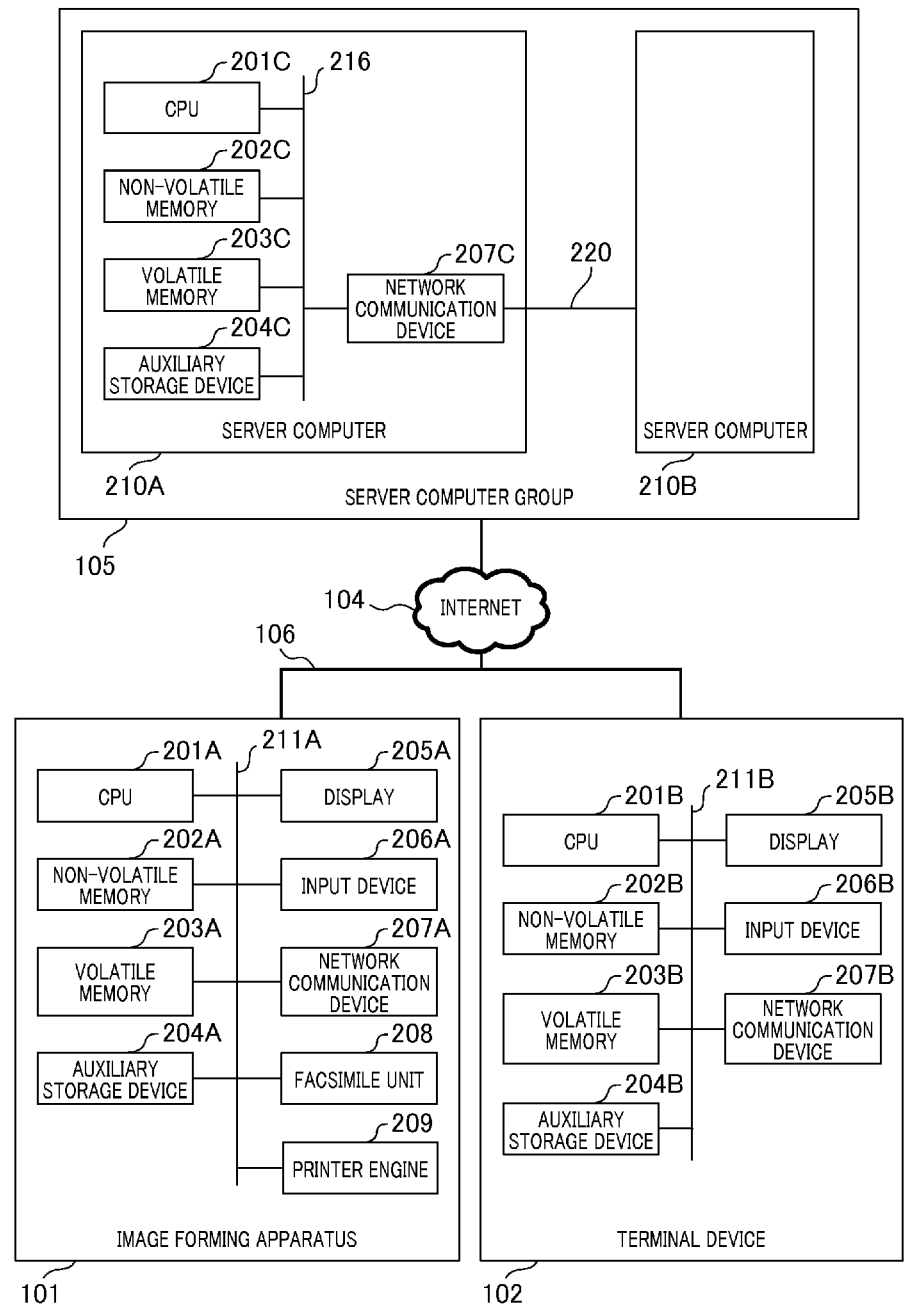
FIG. 2 is a diagram illustrating an example of the hardware configuration of an information processing system.

FIG. 2 is a diagram illustrating an example of the hardware configuration of the information processing system of the present embodiment. The server computer group 105 includes a server computer 210A and a server computer 210B. The server computer 210B has the same configuration as that of the server computer 210A. The server computer 210A and the server computer 210B communicate with each other via a network 220.

The server computer 210A includes a CPU 201C, a non-volatile memory 202C, a volatile memory 203C, an auxiliary storage device 204C, and a network communication device 207C that are connected to an internal bus 216. The image forming apparatus 101 includes a CPU 201A, a non-volatile memory 202A, a volatile memory 203A, an auxiliary storage device 204A, a display 205A, an input device 206A, a network communication device 207A, a facsimile unit 208, and a printer engine 209 that are connected to an internal bus 211A. The terminal apparatus 102 includes a CPU 201B, a non-volatile memory 202B, a volatile memory 203B, an auxiliary storage device 204B, a display 205B, an input device 206B, and a network communication device 207B that are connected to an internal bus 211B.

In the following description, the CPU 201A, 201B, and 201C are also described as a CPU 201, the non-volatile memories 202A, 202B, and 202C are also described as a non-volatile memory 202, the volatile memories 203A, 203B, and 203C are also described as a volatile memory 203, the auxiliary storage devices 204A, 204B, and 204C are also described as an auxiliary storage device 204, the displays 205A and 205B are also described as a display 205, the input devices 206A and 206B are also described as an input device 206, the network communication devices 207A and 207B are also described as a network communication device 207, and the internal buses 211A and 211B are also described as an internal bus 211.

The CPU (Central Processing Unit) 201 executes programs and controls various types of processing. The non-volatile memory 202 includes a ROM (Read Only Memory). The non-volatile memory 202 stores programs and data that is required for device start processing at the initial stage. The volatile memory 203 includes a RAM (Random Access Memory). The volatile memory 203 is used as a temporary storage location of the programs and data.

The auxiliary storage device 204 is a large-capacity storage device such as a hard disk, a RAM drive, or the like. The auxiliary storage device 204 stores large-capacity data and holds the execution code of the programs. The auxiliary storage device 204 stores data which needs to be held for a longer time than that of the volatile memory 203. The display 205 performs information display processing and notifies a user person of the resulting information. In the present embodiment, a user person denotes a user and a service person.

The input device 206 accepts a user person's selection instruction and transmits the instruction to a program via the internal bus 211. The network communication device 207 is a device that communicates with an external device via a network. The facsimile unit 208 is a hardware unit that transmits the image data formed by the image forming apparatus 101 or the image data stored in the auxiliary storage device 204A to an external device via the network 106. The facsimile unit 208 is optional and the image forming apparatus 101 may not include the facsimile unit 208. The printer engine 209 prints the image data formed by the image forming apparatus 101 or the image data stored in the auxiliary storage device 204A on a recording medium such as paper.

Figure 3:
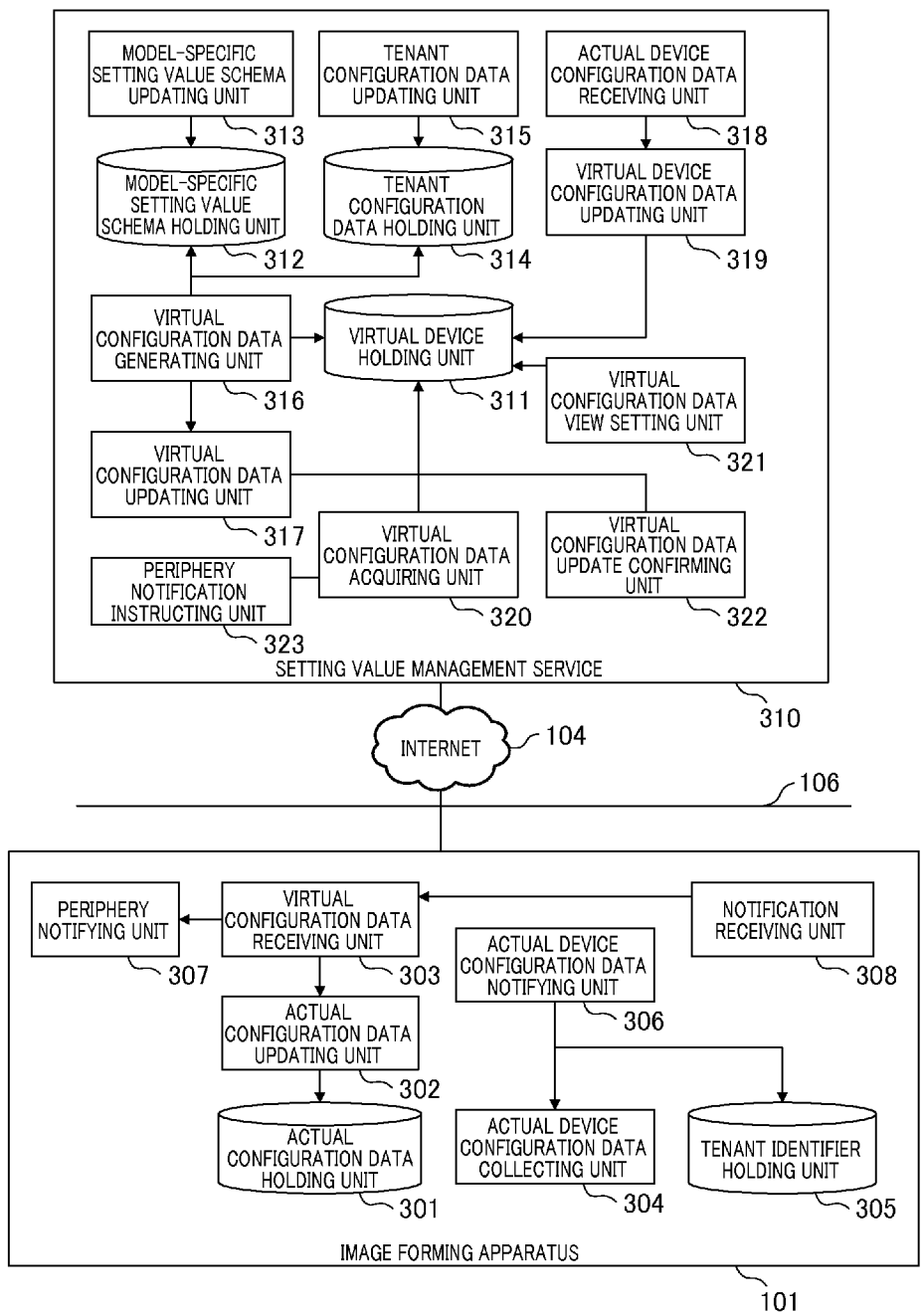
FIG. 3 is an exemplary functional block diagram illustrating the information processing system.

FIG. 3 is an exemplary functional block diagram illustrating the information processing system of the present embodiment. The information processing system shown in FIG. 3 includes an image forming apparatus 101 and a set value management service 310. The image forming apparatus 101 and the set value management service 310 communicate with each other via the Internet 104. The management method of the present embodiment is realized by the functions provided in the information processing system shown in FIG. 3. A computer program according to the present embodiment causes the computer to execute the management method.

The image forming apparatus 101 includes an actual configuration data holding unit 301, an actual configuration data updating unit 302, a virtual configuration data receiving unit 303, an actual device configuration data collecting unit 304, and a tenant identifier holding unit 305. Also, the image forming apparatus 101 includes an actual device configuration data notifying unit 306, a periphery notifying unit 307, and a notification receiving unit 308.

The actual configuration data holding unit 301 holds configuration data for an image forming apparatus. More specifically, the actual configuration data holding unit 301 stores configuration data in the auxiliary storage device 204A for management. The image forming apparatus switches an operational behavior based on actual configuration data held by the actual configuration data holding unit 301.

The actual configuration data updating unit 302 updates actual configuration data held by the actual configuration data holding unit 301. More specifically, the actual configuration data updating unit 302 updates actual configuration data by replacing it with virtual configuration data acquired by the virtual configuration data receiving unit 303. The actual configuration data is applied to the image forming apparatus 101. In other words, the actual configuration data updating unit 302 functions as an applying unit that applies the virtual configuration data acquired by the virtual configuration data receiving unit 303 to the image forming apparatus 101.

The virtual configuration data receiving unit 303 acquires virtual configuration data from the virtual configuration data acquiring unit 320 provided in the set value management service 310. The virtual configuration data receiving unit 303 calls the virtual configuration data acquiring unit 320 using an address which is set in the actual configuration data held by the actual configuration data holding unit 301. Then, the virtual configuration data receiving unit 303 transmits a virtual configuration data acquisition request to the virtual configuration data acquiring unit 320. The virtual configuration data acquisition request is for requesting transmission of virtual configuration data from the virtual configuration data acquiring unit 320.

When the fact that virtual configuration data of the image forming apparatus 101 has been updated is notified from the set value management service 310, the virtual configuration data receiving unit 303 transmits a virtual configuration data acquisition request. In other words, the acquisition request of virtual configuration data in this case is an acquisition request of configuration data of the updated image forming apparatus. The virtual configuration data acquiring unit 320 acquires virtual configuration data of image forming apparatus that is a request source in response to the acquisition request of the virtual configuration data. Then, the virtual configuration data acquiring unit 320 transmits a response including the acquired virtual configuration data and the periphery notification instruction (response to virtual configuration data acquisition request) to the request source. The periphery notification instruction means control information that instructs the image forming apparatus that is the request source of virtual configuration data to notify other image forming apparatus (hereinafter described as surrounding image forming apparatus) different from the request source that virtual configuration data of the request source has been updated.

In other words, the virtual configuration data acquiring unit 320 functions as a transmitting unit that executes following processing. The virtual configuration data acquiring unit 320 transmits virtual configuration data of the updated image forming apparatus and the periphery notification instruction to the image forming apparatus as a response to the acquisition request of virtual configuration data. Also, the virtual configuration data receiving unit 303 functions as a requesting unit that transmits an acquisition request of updated virtual configuration data of the own apparatus to the set value management service 310 and receives virtual configuration data and the periphery notification instruction as a response to the acquisition request.

FIG. 4 is a diagram illustrating an example of actual configuration data. Actual configuration data has data items including a set value identifier 1102, a value 1103, and an identifier number 1104, and the like. The set value identifier 1102 is an identifier for uniquely identifying a setting item. The value 1103 is a value of the setting value.

In the example shown in FIG. 4, http://ddd.com/config is set as the value (address) of "device_settings.cloud_address". The address is an address for a set value management service which is set as the set value management service for distributing configuration data to the image forming apparatus 101. Thus, the virtual configuration data receiving unit 303 described above accesses the address. The identifier number 1104 is an internal management number having same meaning with the set value identifier 1102, and corresponds to the set value identifier 1102 one on one.

Referring back to FIG. 3, the virtual configuration data receiving unit 303 determines whether or not the periphery notification instruction is included in the response to virtual configuration data acquisition request acquired from the set value management service 310. The virtual configuration data receiving unit 303 further receives an update notification from other image forming apparatus via the notification receiving unit 308 on the network 106. The update notification is a notification that conveys the fact that configuration data has been updated to one or more image forming apparatuses other than the own apparatus. The virtual configuration data receiving unit 303 transmits an acquisition request to the set value management service 310 using the reception of the update notification as a trigger.

FIGS. 5A to 5C are diagrams illustrating an example of virtual configuration data. FIG. 5A shows actual configuration data for an image forming apparatus of which the device identifier is "010001". FIG. 5B shows actual configuration data for an image forming apparatus of which the device identifier is "010002". FIG. 5C shows actual configuration data for an image forming apparatus of which the device identifier is "020001". The device identifier is identification information for uniquely identifying an image forming apparatus.

Virtual configuration data has data items including such as a set value identifier 702, a value 703, and an identifier number. The set value identifier 702 is an identifier for uniquely identifying the setting item. The value 703 is a value of the setting item. The identifier number 704 is an internal management number that has same meaning with the set value identifier 702, and corresponds to the set value identifier 702 one on one.

Referring back to FIG. 3, the actual device configuration data collecting unit 304 collects device configuration data (actual device configuration data) of the image forming apparatus 101.

FIGS. 6A to 6C are diagrams illustrating an example of actual device configuration data. Each of FIGS. 6A, 6B, and 6C shows actual device configuration data for a different image forming apparatus. Actual device configuration data has data items including a data type 602 and a value 603. The data type 602 is the type of data included in actual device configuration data. A model code for identifying the model of an image forming apparatus, a firmware version, a device identifier for identifying a device, and the like are set to the data type 602. The value 603 is the value of data. A value (e.g., the value of a device identifier, the presence/absence of a facsimile unit, or the like) corresponding to the data type is set to the value 603.

Referring back to FIG. 3, the tenant identifier holding unit 305 holds a tenant identifier that is the identifier of a tenant to which the image forming apparatus 101 belongs. The tenant identifier is set upon initial installation of the image forming apparatus 101 and is stored in the auxiliary storage device 204A so as not to be lost even when the power is OFF.

The actual device configuration data notifying unit 306 notifies the actual device configuration data receiving unit 318 of the set value management service 310 of the actual device configuration data collected by the actual device configuration data collecting unit 304 and the tenant identifier held by the tenant identifier holding unit 305. More specifically, the actual device configuration data notifying unit 306 transmits a configuration data generation request including the actual device configuration data and the tenant identifier to the actual device configuration data receiving unit 318. The configuration data generation request is a request (operation setting generation request) for generating virtual configuration data corresponding to the image forming apparatus 101.

The periphery notifying unit 307 receives the periphery notification instruction included in the response to virtual configuration data acquisition request which the virtual configuration data receiving unit 303 received from the set value management service 310. The periphery notifying unit 307 functions as a notifying unit that notifies (performs the update notification) one or more other image forming apparatuses on the network 106 that virtual configuration data has been updated in the set value management service 310 according to the periphery notification instruction.

The notification receiving unit 308 functions as a receiving unit that receives the update notification from the periphery notifying unit 307 provided in other image forming apparatus. Also, the notification receiving unit 308 functions as an analyzing unit that analyzes the received update notification. The notification receiving unit 308 analyzes an updated content of virtual configuration data indicated by the received update notification, and determined whether or not the setting associated with the own apparatus has been updated based on the analysis result. When the notification receiving unit 308 determines that the setting associated with the own apparatus has been updated, the notification receiving unit 308 instructs the virtual configuration data receiving unit 303 to transmit an acquisition request of virtual configuration data of the own apparatus to the set value management service 310.

The set value management service 310 includes a virtual device holding unit 311, a model-specific set value schema holding unit 312, a model-specific set value schema updating unit 313, a tenant configuration data holding unit 314, and a tenant configuration data updating unit 315. Also, the set value management service 310 includes a virtual configuration data generating unit 316, a virtual configuration data updating unit 317, an actual device configuration data receiving unit 318, and a virtual device configuration data updating unit 319. Further, the set value management service 310 includes a virtual configuration data acquiring unit 320, a virtual configuration data view setting unit 321, a virtual configuration data update confirming unit 322, and a periphery notification instructing unit 323.

The virtual device holding unit 311 holds a virtual device. The virtual device includes at least virtual device configuration data and virtual configuration data. The virtual device holding unit 311 stores the virtual device in the auxiliary storage device 204C for management.

FIG. 7 is a diagram illustrating an exemplary virtual device. The virtual device shown in FIG. 7 has a device identifier 802, a tenant identifier 803, a virtual device configuration data 804, a virtual configuration data 805, and a notification flag 806.

The device identifier 802 is identification information for uniquely identifying a virtual device. The device identifier 802 corresponds to identification information for uniquely identifying the image forming apparatus 101 corresponding to the virtual device. The device identifier 802 is included in device configuration data which is notified by the image forming apparatus 101 to the set value management service 310. The tenant identifier 803 is identification information for uniquely identifying a tenant to which the image forming apparatus 101 corresponding to the virtual device belongs.

The virtual device configuration data 804 is identification information for uniquely identifying virtual device configuration data. Virtual device configuration data corresponds to device configuration data (actual device configuration data) of the image forming apparatus 101 corresponding to the virtual device. The virtual configuration data 805 is identification information for uniquely identifying virtual configuration data. Virtual configuration data corresponds to configuration data (actual configuration data) of the image forming apparatus 101 corresponding to the virtual device.

The notification flag 806 indicates whether or not the image forming apparatus has already been notified about the virtual configuration data 805. The flag "not-notified" set in the notification flag 806 indicates that the image forming apparatus has not been notified about the virtual configuration data 805. The flag "notified" set in the notification flag 806 indicates that the image forming apparatus has already been notified about the virtual configuration data 805.

Referring back to FIG. 3, the model-specific set value schema holding unit 312 holds the model-specific set value schema. One model-specific set value schema is prepared corresponding to each model of image forming apparatuses.

FIGS. 8A and 8B are diagrams illustrating an exemplary model-specific set value schema. FIG. 7A shows a model-specific set value schema corresponding to the model code of 0x01. FIG. 8B shows a model-specific set value schema corresponding to the model code of 0x02. The model-specific set value schema has data items including a set value identifier 402, a default value 403, a value range 404, a condition 405, and an identifier number 406.

The set value identifier 402 is identification information for uniquely identifying a setting item. For example, the set value identifier "copy_settings.nup" indicates a setting item relating to imposition in copy settings. If the set value identifiers 402 are identical, it indicates the fact that the setting items are identical in spite of different models. The default value 403 is a default set value for the model. The value range 404 is a definition of a range which can be set in the model. For example, the value range 404 of the set value identifier "copy_settings.nup" indicates that the value range can be selected from three types of copy settings "1 in 1, 2 in 1, and 4 in 1" in the model.

The condition 405 is a definition of the conditions necessary for using set values in the model. The condition "facsimile unit" is set in the condition 405 corresponding to the setting item of "fax_settings.received_print". Thus, the set value for the setting item becomes valid only when mounting of a facsimile unit is confirmed. The identifier number 406 is an internal management number having same meaning with the set value identifier 402, and corresponds to the set value identifier 402 one on one.

Referring back to FIG. 3, the model-specific set value schema updating unit 313 updates the model-specific set value schema held by the model-specific set value schema holding unit 312. For example, when a vendor of the image forming apparatus releases a new model, a model-specific set value schema corresponding to the new model is registered in accordance with the instruction given by the administrator of the vendor. If any setting item is changed, the model-specific set value schema updating unit 313 updates the model-specific set value schema. The tenant configuration data holding unit 314 holds configuration data that a tenant would like to set to an image forming apparatus.

FIG. 9 is a diagram illustrating an example of tenant configuration data. Tenant configuration data has data items including a set value identifier 502, a value 503, a notification instruction flag 504, and an identifier number 505. The set value identifier 502 is the same as the set value identifier 402 included in the model-specific set value schema shown in FIG. 7. The value 503 is a common setting value desired by a tenant. The copy setting "2 in 1" is set in the set value identifier "copy_settings.nup". This indicates that the user desires that the copy setting "2 in 1" be set in all image forming apparatuses held by a tenant.

The notification instruction flag 504 indicates whether or not the periphery notification instruction that instructs the image forming apparatus that is a request source of configuration data to notify surrounding image forming apparatus that the setting value corresponding to the value 503 has been updated. "Notified" set in the notification instruction flag 504 indicates that the periphery notification instruction that instructs the image forming apparatus that is the require requester of configuration data to notify the surrounding image forming apparatus that the setting value has been transmitted. "not-notified" set in the notification instruction flag 504 indicates that the periphery notification instruction that instructs the image forming apparatus that is the require requester of configuration data to notify the surrounding image forming apparatus that the setting value has not been transmitted. A description regarding the periphery notification instruction as will become apparent below. The identifier number 505 is an internal management number having same meaning with the set value identifier 502, and corresponds to the set value identifier 502 one on one.

Referring back to FIG. 3, the tenant configuration data updating unit 315 updates tenant configuration data held by the tenant configuration data holding unit 314. In accordance with the operation by a service person who manages image forming apparatuses held by a tenant, the terminal apparatus 102B in the service person environment 110 provides an update instruction for tenant configuration data. The tenant configuration data updating unit 315 updates tenant configuration data in accordance with the update instruction. The service person performs operation on a setting screen of tenant configuration data which is displayed on a web browser running on the terminal apparatus 102B. A service person performs operation on a setting screen of tenant configuration data displayed on the web browser running in the terminal device 102B.

Figures 10, 11:
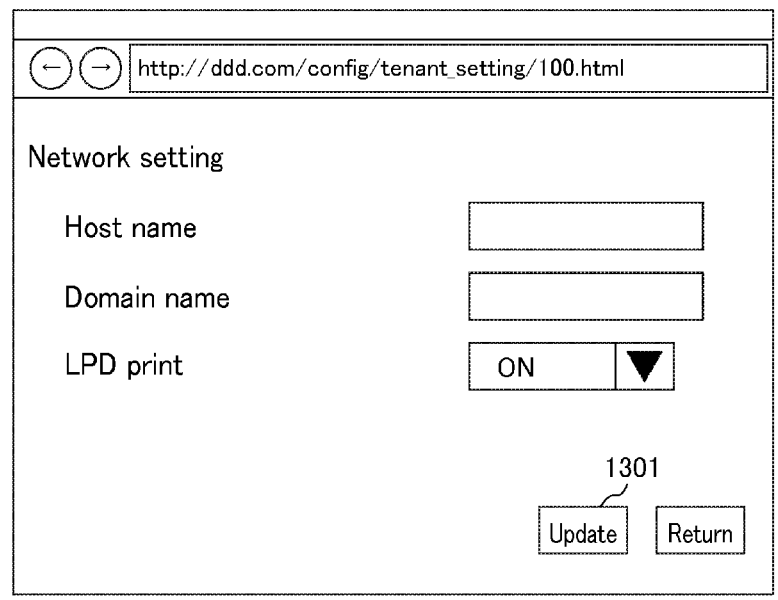
FIG. 10 is diagram illustrating an example of a setting screen of tenant configuration data.
FIG. 11 is diagram illustrating an example of a viewing/setting screen.

FIG. 10 is a diagram illustrating an example of a setting screen of tenant configuration data displayed by the terminal device 102B. The service person inputs each setting value through this screen and depresses an update button 1301 to thereby update tenant configuration data.

The virtual configuration data generating unit 316 generates virtual configuration data based on the model-specific set value schema, tenant configuration data, and virtual device configuration data. Firstly, the virtual configuration data generating unit 316 acquires virtual device configuration data shown in FIG. 6A from the virtual device holding unit 311.

Next, the virtual configuration data generating unit 316 refers to a model code included in the acquired virtual device configuration data to thereby specify the model of the image forming apparatus. Using the virtual device configuration data shown in FIG. 5A as an example, 0x01 is set as a value corresponding to the model code. Thus, the virtual configuration data generating unit 316 specifies the model of the image forming apparatus having the model code of 0x01.

Next, the virtual configuration data generating unit 316 acquires a model-specific set value schema corresponding to the specified model code from the model-specific set value schema holding unit 312. The virtual configuration data generating unit 316 acquires, for example, the model-specific set value schema shown in FIG. 8A, of which the model code matches 0x01.

Next, the virtual configuration data generating unit 316 generates virtual configuration data based on the set values defined in the acquired model-specific set value schema. Using the model-specific set value schema shown in FIG. 8A as an example, the virtual configuration data generating unit 316 generates virtual configuration data based on set values corresponding to six setting items "copy_settings.nup", "device_settings.cloud_address", "device_settings.sleep_time", "fax_settings.received_print", "box_settings.server_address", and "network_settings.domain_name".

Next, the virtual configuration data generating unit 316 acquires tenant configuration data shown in FIG. 9 from the tenant configuration data holding unit 314. The virtual configuration data generating unit 316 determines whether or not the set value included in tenant configuration data falls within the value range defined in the model-specific set value schema.

A description will be given by taking an example of tenant configuration data shown in FIG. 9 and model-specific set value schema shown in FIG. 8A. The value (set value) for the setting item "copy_settings.nup" included in tenant configuration data is "2 in 1". On the other hand, the value range corresponding to the setting item, which is defined in the model-specific set value schema, is "1 in 1, 2 in 1, and 4 in 1". Thus, the set value included in tenant configuration data falls within the value range defined in the model-specific set value schema.

The value (set value) for the setting item "device_settings.sleep_time" included in tenant configuration data is "10 seconds". On the other hand, the value range corresponding to the setting item, which is defined in the model-specific set value schema, is "1 minute, 10 minutes, and 1 hour". Thus, the set value included in tenant configuration data does not fall within the value range defined in the model-specific set value schema. When the set value included in tenant configuration data does not fall within the value range defined in the model-specific set value schema, the virtual configuration data generating unit 316 acquires the default value defined in the model-specific set value schema. In this example, the default value "10 minutes" is acquired. The virtual configuration data generating unit 316 uses the acquired default value as the set value for the setting item in virtual configuration data.

When the set value included in tenant configuration data falls within the value range defined in the model-specific set value schema, the virtual configuration data generating unit 316 takes the set value included in tenant configuration data as the set value corresponding to the setting item of virtual configuration data.

Next, the virtual configuration data generating unit 316 determines whether or not virtual device configuration data satisfies the condition defined in the model-specific set value schema. Referring to the model-specific set value schema shown in FIG. 8A, there is no particular condition corresponding to "copy_settings.nup". Thus, virtual device configuration data shown in FIG. 6A satisfies the condition corresponding to "copy_settings.nup".

However, the condition corresponding to "fax_settings.received_print" is "facsimile unit", whereas the value "none" is set as a value for "facsimile unit" included in virtual device configuration data. Thus, virtual device configuration data does not satisfy the condition corresponding to the setting item.

When virtual device configuration data does not satisfy the condition defined in the model-specific set value schema, the virtual configuration data generating unit 316 acquires the default value 403 defined in the model-specific set value schema. In this example, the virtual configuration data generating unit 316 acquires a default value "OFF" corresponding to "fax_settings.received_print". The virtual configuration data generating unit 316 uses the acquired default value as the set value for the setting item in virtual configuration data.

Referring back to FIG. 3, the virtual configuration data updating unit 317 functions as an updating unit that updates virtual configuration data in the virtual device held by the virtual device holding unit 311 with virtual configuration data generated by the virtual configuration data generating unit 316.

More specifically, among the virtual devices held by the virtual device holding unit 311, the virtual configuration data updating unit 317 acquires a virtual device having a device identifier corresponding to the generated virtual configuration data. Then, the virtual configuration data updating unit 317 updates virtual configuration data included in the acquired virtual device by replacing it with the generated virtual configuration data. When the notification flag 806 for the virtual device is "notified", the virtual configuration data updating unit 317 sets the notification flag 806 to "not-notified". Setting the notification flag 806 to "not-notified" means that virtual configuration data corresponding to an image forming apparatus is changed so that the image forming apparatus needs to refer to new virtual configuration data.

The actual device configuration data receiving unit 318 receives device configuration data (FIG. 6) and a tenant identifier from the actual device configuration data notifying unit 306 provided in the image forming apparatus 101. The virtual device configuration data updating unit 319 updates virtual device configuration data retained by the virtual device held by the virtual device holding unit 311 with device configuration data received by the actual device configuration data receiving unit 318. More specifically, among the virtual devices held by the virtual device holding unit 311, the virtual device configuration data updating unit 319 acquires a virtual device having a device identifier that is set in device configuration data received by the actual device configuration data receiving unit 318. Then, the virtual device configuration data updating unit 319 updates virtual device configuration data retained by the acquired virtual device with device configuration data received by the actual device configuration data receiving unit 318.

The virtual configuration data acquiring unit 320 receives a virtual configuration data acquisition request from the virtual configuration data receiving unit 303 provided in the image forming apparatus 101 via the Internet 104 to thereby acquire virtual configuration data from the virtual device holding unit 311.

The virtual configuration data acquisition request includes at least a device identifier for specifying a virtual device. Thus, the virtual configuration data acquiring unit 320 searches for a virtual device having a device identifier included in the virtual configuration data acquisition request. The virtual configuration data acquiring unit 320 acquires virtual configuration data retained by the searched virtual device. Then, the virtual configuration data acquiring unit 320 passes the acquired virtual configuration data to the request source, i.e., the virtual configuration data receiving unit 303 via the Internet 104.

The virtual configuration data view setting unit 321 receives a configuration data viewing/setting request from an external device via the Internet 104. The configuration data viewing/setting request is a request on an HTTP protocol. The virtual configuration data view setting unit 321 acquires virtual configuration data corresponding to the viewing/setting request and generates a HTML page for viewing for the acquired virtual configuration data and returns the HTML page for viewing to the request source. The request source displays a viewing/setting screen based on the HTML page returned from the virtual configuration data view setting unit 321 and performs viewing/setting of virtual configuration data depending on the operation on the viewing/setting screen by a user.

FIG. 11 is a diagram illustrating an example of a viewing/setting screen. As shown in FIG. 11, a description will be given by taking a viewing/setting screen displayed by the terminal device 102B on the web browser. The virtual device shown in FIG. 7 is displayed in the viewing/setting screen. When a service person selects a link 1401 to virtual configuration data, the terminal device 102B displays virtual configuration data held by each virtual device on a configuration display screen shown in FIG. 12.

Figure 12:
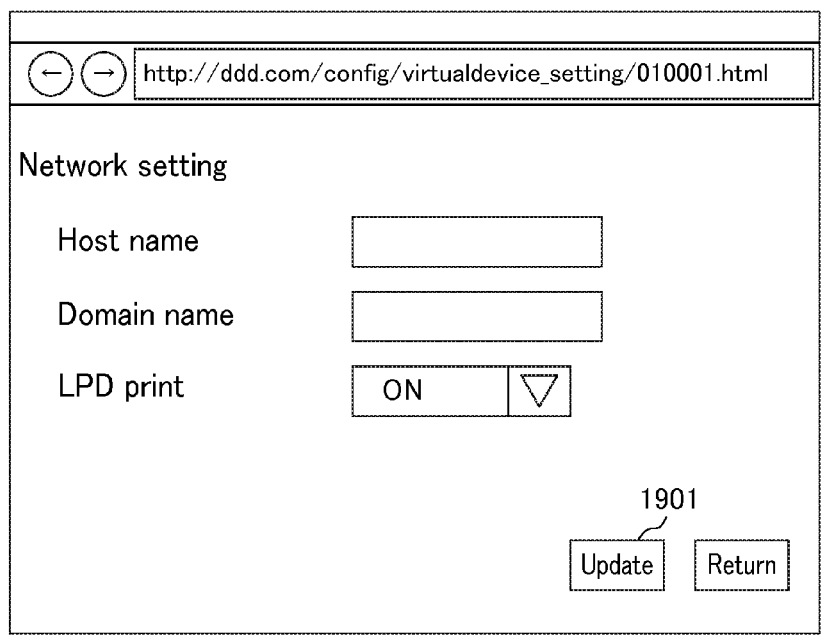
FIG. 12 is diagram illustrating an example of a configuration display screen.

FIG. 12 is a diagram illustrating an example of a configuration display screen. The setting value registered by virtual configuration data updating unit 317 is a base of a setting value displayed on the configuration display screen. When the service person hopes to change individual configuration data for each image forming apparatus, he changes any settings on the configuration display screen. When the service person changes the setting of configuration data, he depresses an update button 1901 after inputting the setting value on the configuration display screen. In this manner, configuration data is saved in the virtual device holding unit 311, "not-notified" is set in the notification flag 806.

The virtual configuration data update confirming unit 322 confirms whether or not virtual configuration data has been updated. More specifically, the virtual configuration data receiving unit 303 provided in the image forming apparatus 101 transmits the device identifier of the image forming apparatus 101 to the virtual configuration data update confirming unit 322 via the Internet 104. The virtual configuration data update confirming unit 322 searches a virtual device matching the received device identifier from among the virtual devices held by the virtual device holding unit 311. The virtual configuration data update confirming unit 322 refers to the notification flag 806 for the searched virtual device.

When the notification flag 806 is "not-notified", the virtual configuration data update confirming unit 322 determines that virtual configuration data has been updated. When the notification flag 806 is "notified", the virtual configuration data update confirming unit 322 determines that virtual configuration data has not been updated. The virtual configuration data update confirming unit 322 notifies as to whether virtual configuration data has been updated to the virtual configuration data receiving unit 303. Then, the virtual configuration data receiving unit 303 that has confirmed the update of virtual configuration data makes a configuration data acquisition request to the virtual configuration data acquiring unit 320 of the set value management service 310.

The virtual configuration data update confirming unit 322 may also confirm whether or not virtual configuration data has been updated using the update of virtual configuration data by the virtual configuration data updating unit 317 as a trigger. Then, when the virtual configuration data update confirming unit 322 confirms that virtual configuration data has been updated, the virtual configuration data acquiring unit 320 may also acquire configuration data and transmit it to virtual configuration data receiving unit 303 provided in the image forming apparatus 101.

The periphery notification instructing unit 323 determines whether or not to transmit the periphery notification instruction to the image forming apparatus that is an acquisition request source of virtual configuration data. More specifically, the periphery notification instructing unit 323 refers to the notification instruction flag 504 retained by tenant configuration data shown in FIG. 9. Then, the periphery notification instructing unit 323 specifies the setting item which "not-notified" is set in the notification instruction flag 504 as an updated setting item, that is, a setting item to be notified to the surrounding image forming apparatus.

The periphery notification instructing unit 323 generates a periphery notification instruction that instructs the image forming apparatus that is the acquisition request source of virtual configuration data to notify the surrounding image forming apparatus that the specified setting item has been updated. Then, the periphery notification instructing unit 323 includes the generated periphery notification instruction in the response to the virtual configuration data acquisition request that is passed by the virtual configuration data acquiring unit 320 to the image forming apparatus that is the acquisition request source of virtual configuration data. In other words, the periphery notification instructing unit 323 functions as a notification instructing unit that instructs the image forming apparatus that is the acquisition request source of virtual configuration data to notify other image forming apparatus different from the image forming apparatus that the operation setting information has been updated.

Figure 13:
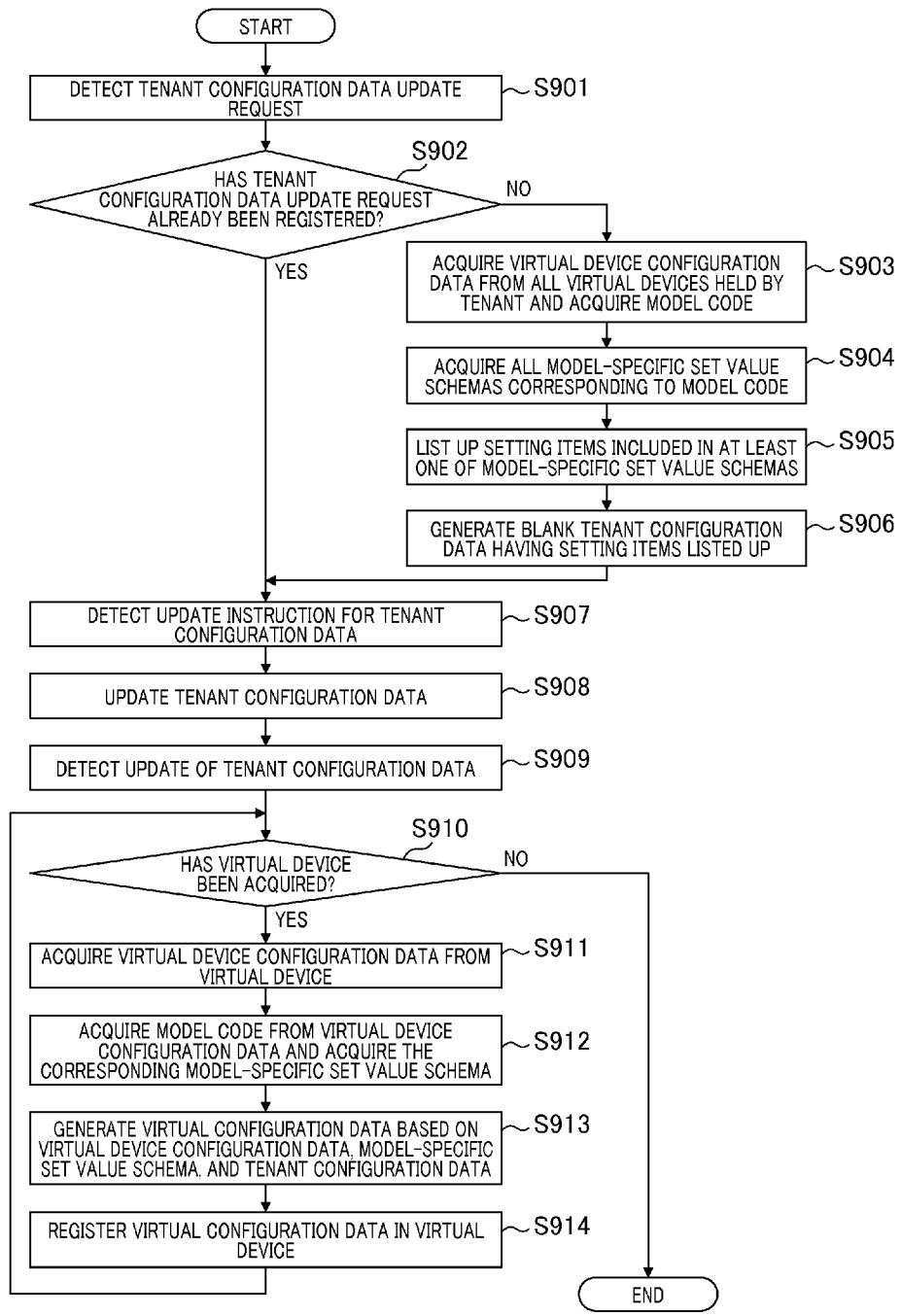
FIG. 13 is diagram describing update processing of tenant configuration data.

FIG. 13 is an exemplary flowchart illustrating processing for updating tenant configuration data. In this example, an administrator user updates tenant configuration data using the terminal apparatus 102A. A program for executing the processes in steps of the flowchart shown in FIG. 11 is stored in any one of the storage units that are the non-volatile memory 202C, the volatile memory 203C, and the auxiliary storage device 204C and is executed by the CPU 201C.

Firstly, the tenant configuration data updating unit 315 detects a tenant configuration data update request transmitted from the terminal apparatus 102A (step S901). Next, the tenant configuration data updating unit 315 confirms whether or not tenant configuration data corresponding to the tenant configuration data update request has already been registered to the tenant configuration data holding unit 314 (step S902). When tenant configuration data corresponding to the tenant configuration data update request has already been registered, the process advances to step S907. When tenant configuration data corresponding to the tenant configuration data update request has not yet been registered, the process advances to step S903.

In step S903, the tenant configuration data updating unit 315 acquires a virtual device held by a tenant from the virtual device holding unit 311. The tenant configuration data updating unit 315 acquires virtual device configuration data included in the acquired virtual device. Then, the tenant configuration data updating unit 315 acquires a model code included in the acquired virtual device configuration data (step S903).

Next, the tenant configuration data updating unit 315 acquires model-specific set value schemas corresponding to the acquired model code from the model-specific set value schema holding unit 312 (step S904). Next, the tenant configuration data updating unit 315 lists the setting items included in at least one of the model-specific set value schemas acquired in step S904 (step S905). Then, the tenant configuration data updating unit 315 generates blank tenant configuration data having the setting items listed up in step S905 (step S906), and the process advances to step S907.

In step S907, the tenant configuration data updating unit 315 detects a specific update instruction for tenant configuration data (step S907). Then, the tenant configuration data updating unit 315 updates tenant configuration data based on the update instruction detected in step S907 (step S908). The tenant configuration data holding unit 314 stores the updated tenant configuration data.

Next, the virtual configuration data generating unit 316 detects that tenant configuration data has been updated (step S909). Then, the virtual configuration data generating unit 316 searches a virtual device, of which the tenant identifier matches the tenant identifier of tenant configuration data of which an update has been detected, from the virtual devices held by the virtual device holding unit 311. In order to perform processing for the searched virtual devices in sequence, the virtual configuration data generating unit 316 acquires one virtual device. The virtual configuration data generating unit 316 determines whether or not the virtual device is successively acquired (step S910). When processing for all virtual devices is performed in sequence and the next virtual device cannot be acquired, the process ends. When the virtual configuration data generating unit 316 successively acquires the next virtual device, the process advances to step S911.

In step S911, the virtual configuration data generating unit 316 acquires virtual device configuration data from a virtual device to be processed (step S911). Next, the virtual configuration data generating unit 316 acquires a model code from virtual device configuration data acquired in step S911. Then, the virtual configuration data generating unit 316 acquires a model-specific set value schema corresponding to the acquired model code from the model-specific set value schema holding unit 312 (step S912).

Next, the virtual configuration data generating unit 316 generates virtual configuration data based on the virtual device configuration data, model-specific set value schema, and tenant configuration data (step S913). Then, the virtual configuration data updating unit 317 registers the generated virtual configuration data in the virtual device (step S914), and the process returns to step S910. Through the process in step S914, the updated tenant configuration data is reflected in the virtual device.

Figure 14:
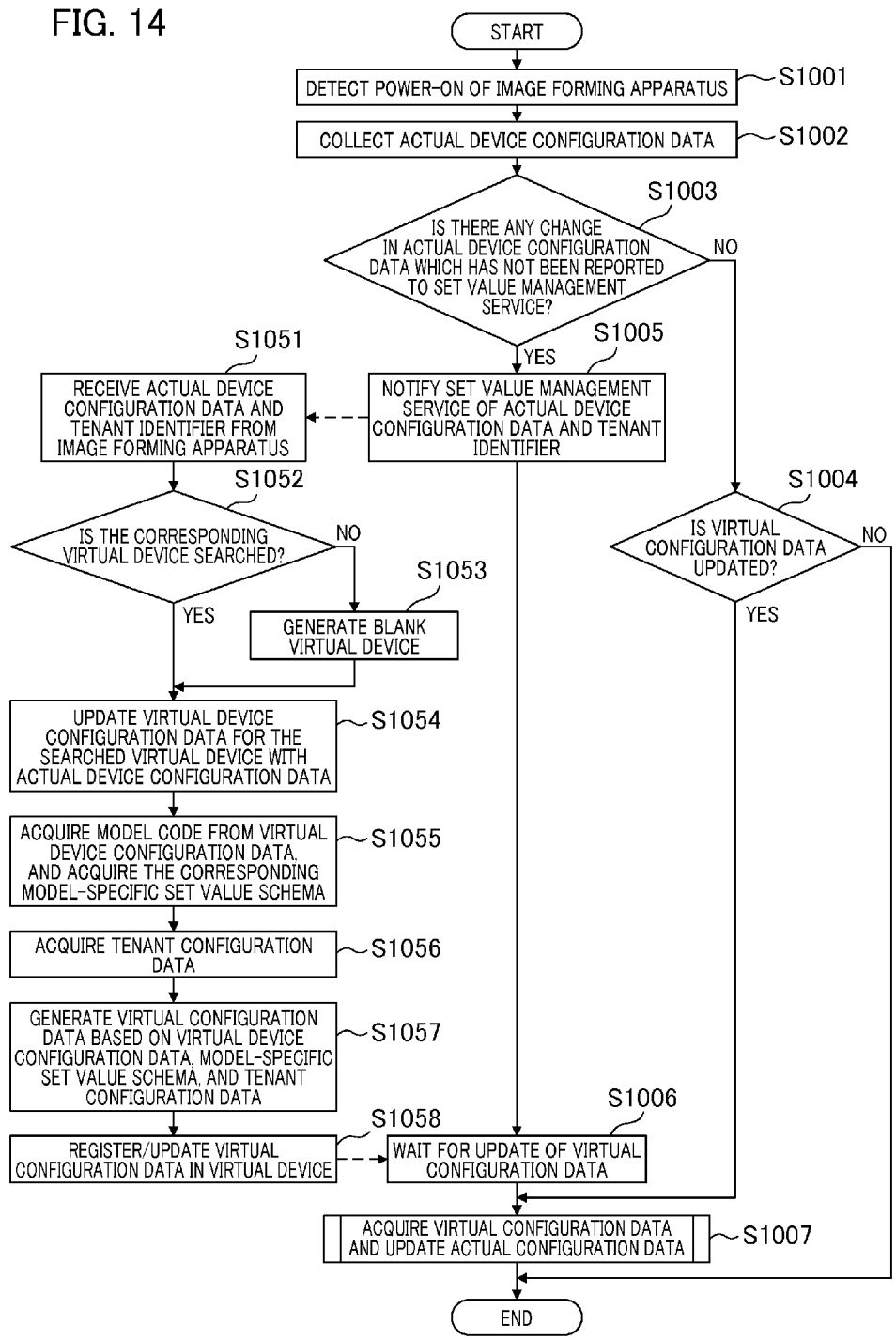
FIG. 14 is a diagram describing processing for acquiring virtual configuration data.

FIG. 14 is an exemplary flowchart illustrating processing for acquiring virtual configuration data by an image forming apparatus. The processes in steps S1001 to S1007 shown in FIG. 14 are executed by an image forming apparatus. A program for executing the processes in steps of the flowchart shown in FIG. 12 is stored in any one of the storage units that are the non-volatile memory 202A, the volatile memory 203A, and the auxiliary storage device 204A and is executed by the CPU 201A. Also, the processes in steps S1051 to S1058 shown in FIG. 12 are executed by the server computer group 105. A program for executing the processes in steps of the flowchart shown in FIG. 12 is stored in any one of the storage units that are the non-volatile memory 202C, the volatile memory 203C, and the auxiliary storage device 204C, and is executed by the CPU 201C.

Firstly, the actual device configuration data notifying unit 306 of the image forming apparatus 101 detects the power-ON of the image forming apparatus 101 (step S1001). Next, the actual device configuration data collecting unit 304 collects device configuration data (step S1002).

Next, the actual device configuration data notifying unit 306 functions as a configuration change determining unit that determines whether there is any change in configuration information about the devices provided in the image forming apparatus 101. More specifically, the actual device configuration data notifying unit 306 determines whether there is any change in actual device configuration data, which has not been reported to the set value management service 310, based on actual device configuration data collected in step S1002 (step S1003).

If there is any change in actual device configuration data which has not been reported, the process advances to step S1005. If there is no change in actual device configuration data which has not been reported, the process advances to step S1004. When a new device is installed, the process advances to step S1005.

In step S1004, the virtual configuration data receiving unit 303 determines whether or not the device has already acquired the latest virtual configuration data, that is, the virtual configuration data has already been updated (step S1004). More specifically, the virtual configuration data receiving unit 303 confirms with the virtual configuration data update confirming unit 322 of the set value management service 310 via the Internet 104 whether or not virtual configuration data has been updated. The virtual configuration data receiving unit 303 determines whether or not virtual configuration data has been updated based on the confirmation result. If virtual configuration data has not been updated, the process ends. If virtual configuration data has been updated, the process advances to step S1007.

In step S1005, the actual device configuration data notifying unit 306 notifies the set value management service 310 about a configuration data generation request including actual device configuration data and the tenant identifier (step S1005). The notification destination address is an address held by the actual configuration data holding unit 301.

In step S1051, the set value management service 310 detects the notification and then perform processing. A detailed description of processing executed by the set value management service 310 will be given below.

Next, the virtual configuration data receiving unit 303 waits for the execution of the processing until the update of virtual configuration data is completed (step S1006). Next, the virtual configuration data receiving unit 303 receives virtual configuration data from the set value management service 310. Then, the virtual configuration data updating unit 317 updates the received virtual configuration data as actual configuration data (step S1007). Actual configuration data is stored by the actual configuration data holding unit 301.

In step S1051, the actual device configuration data receiving unit 318 of the set value management service 310 accepts the configuration data generation request including actual device configuration data and the tenant identifier from the image forming apparatus 101 (step S1051).

Next, among the virtual devices held by the virtual device holding unit 311, the virtual device configuration data updating unit 319 searches for a virtual device that matches the actual device configuration data and the tenant identifier both included in the configuration data generation request received in S1051 (step S1054). If the matched virtual device has been found, the process advances to step S1054. If the matched virtual device has not been found, the process advances to step S1053. When an image forming apparatus communicates with the set value management service 310 for the first time upon installation of a new device, there may be cases where searching for a virtual device is not possible. Thus, in this case, the process advances to step S1053.

In step S1053, the virtual device configuration data updating unit 319 generates a blank virtual device (step S1053), and the process advances to step S1054. Next, the virtual device configuration data updating unit 319 updates virtual device configuration data for the virtual device searched in S1052 with actual device configuration data included in the configuration data generation request received in step S1051 (step S1054). Also, the virtual device configuration data updating unit 319 sets actual device configuration data included in the configuration data generation request received in step S1051 as virtual device configuration data for the virtual device generated in step S1053. With this arrangement, the virtual device corresponding to the image forming apparatus 101 is updated.

Next, the virtual configuration data generating unit 316 acquires a model code from virtual device configuration data updated in step S1056. Then, the virtual configuration data generating unit 316 acquires a model-specific set value schema corresponding to the acquired model code from the model-specific set value schema holding unit 312 (step S1055).

Next, the virtual configuration data generating unit 316 acquires tenant configuration data (step S1056). More specifically, the virtual configuration data generating unit 316 acquires tenant configuration data corresponding to the tenant identifier received in step S1051 from tenant configuration data held by the tenant configuration data holding unit 314.

Next, the virtual configuration data generating unit 316 generates virtual configuration data based on the virtual device configuration data, model-specific set value schema, and tenant configuration data (step S1057). The process in step S1057 is the same as that in step S913 shown in FIG. 13.

In other words, the virtual configuration data generating unit 316 generates configuration data corresponding to the image forming apparatus 101 based on configuration information (device configuration data) included in the configuration data generation request.

Next, the virtual configuration data updating unit 317 updates the generated virtual configuration data by registering it in the virtual device in question (step S1058). In step S1058, the virtual configuration data acquiring unit 320 further transmits the generated virtual configuration data to the virtual configuration data receiving unit 303 of the image forming apparatus 101.

First Embodiment

Figure 15:
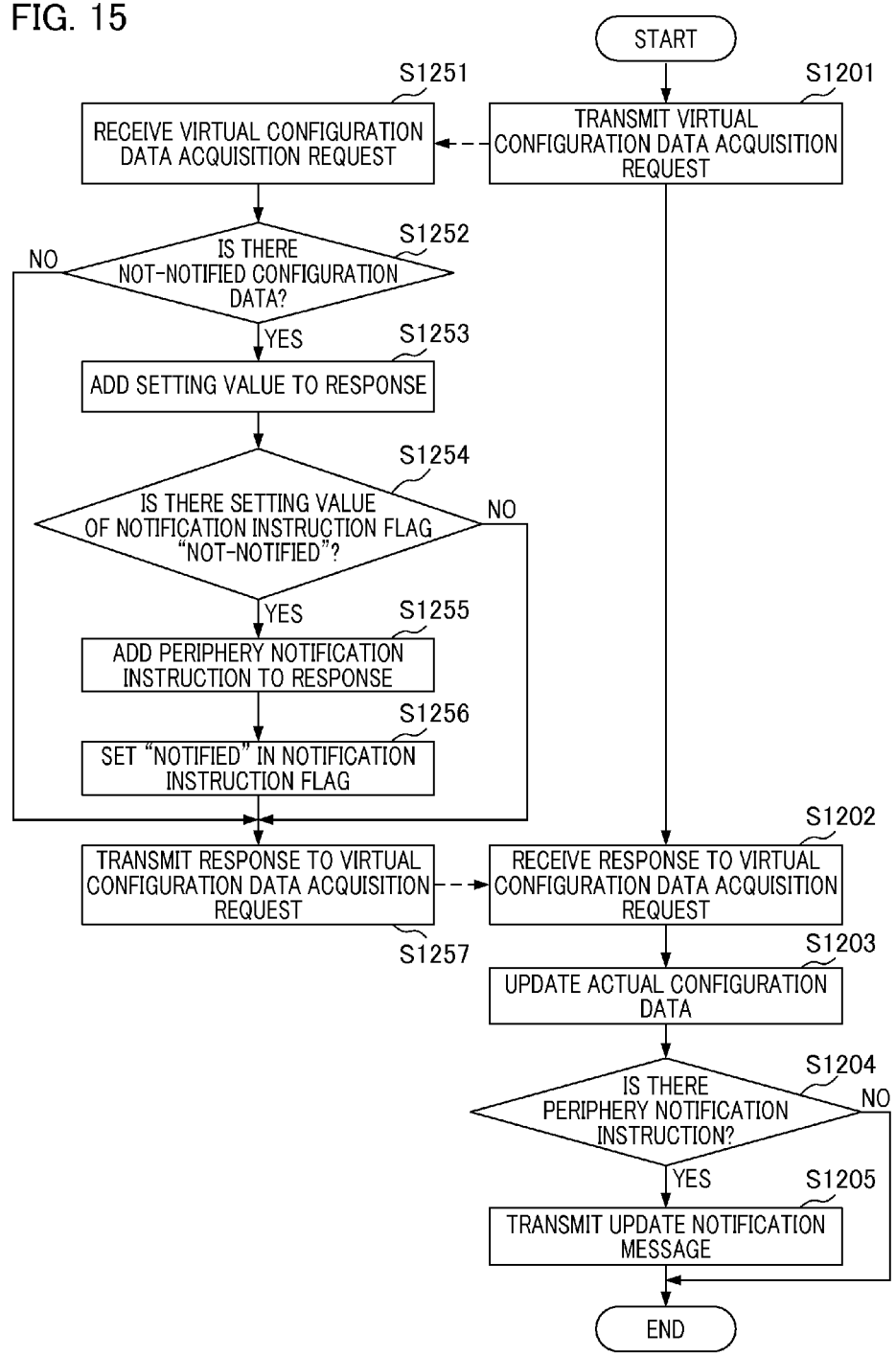
FIG. 15 is a diagram describing virtual configuration data acquisition processing performed in information processing system according to the first embodiment.

FIG. 15 is a flowchart describing virtual configuration data acquisition processing in the information processing system of the first embodiment. More specifically, virtual configuration data acquisition processing described with reference to FIG. 15 corresponds to processing in step S1007 of FIG. 14. Processing in steps S1201 to S1205 is processing executed by the image forming apparatus 101. Each unit that executes processing in these steps is stored in any one of the storage units that are the non-volatile memory 202C, the volatile memory 203C, and the auxiliary storage device 204C, and is executed by the CPU 201C.

Processing in steps S1251 to S1257 is processing executed by the server computer group 105. Each unit that executes processing in these steps is stored in any one of the storage units that are the non-volatile memory 202C, the volatile memory 203C, and the auxiliary storage device 204C, and is executed by the CPU 201C.

Firstly, the virtual configuration data receiving unit 303 transmits a virtual configuration data acquisition request to the virtual configuration data acquiring unit 320 of the set value management service 310 (step S1201). In step 1202, the virtual configuration data receiving unit 303 receives a response to virtual configuration data acquisition request from the set value management service 310 (step S1202).

Next, the actual configuration data updating unit 302 extracts virtual configuration data from the received response to virtual configuration data acquisition request, and updates actual configuration data retained by the actual configuration data holding unit 301 by replacing it with the extracted virtual configuration data (step S1203).

Next, the periphery notifying unit 307 determines whether or not a periphery notification instruction is included in the received response to virtual configuration data acquisition request (step S1204). When the periphery notification instruction is not included in the response to virtual configuration data acquisition request, the process ends. When the periphery notification instruction is included in the response to virtual configuration data acquisition request, the periphery notifying unit 307 transmits an update notification in response to the periphery notification instruction (step S1205). More specifically, the periphery notifying unit 307 notifies surrounding image forming apparatus of an update notification message indicating that virtual configuration data has been updated in the set value management service 310 via broadcast or multicast.

FIG. 16 is a diagram illustrating an example of the update notification message. A block 1701 indicated in the update notification message includes an identifier number list of the updated virtual configuration data. In this example, information indicating that a setting item "fax_setting.received_print" of which the identifier number is 101 has been updated is set in the block 1701.

Next, a description will be given of processing executed by the set value management service 310. The virtual configuration data acquiring unit 320 receives the virtual configuration data acquisition request from the image forming apparatus 101 (step S1251). Subsequently, the virtual configuration data acquiring unit 320 specifies a virtual device corresponding to the image forming apparatus that is an acquisition request source of virtual configuration data among virtual devices held by the virtual device holding unit 311.

Then, the virtual configuration data acquiring unit 320 determines whether or not not-notified virtual configuration data is present in virtual configuration data retained by the specified the virtual device (step S1252). More specifically, the virtual configuration data acquiring unit 320 determines whether or not virtual configuration data 805 corresponding to the notification flag 806 in which "not-notified" is set with reference to the virtual device shown in FIG. 7. When virtual configuration data 805 corresponding to the notification flag 806 in which "not-notified" is set, the virtual configuration data acquiring unit 320 determines that virtual configuration data 805 is not-notified virtual configuration data.

When not-notified virtual configuration data is absent, the process advances to step S1257. When not-notified virtual configuration data is present, the virtual configuration data acquiring unit 320 sets the setting value of not-notified virtual configuration data to the response to virtual configuration data acquisition request (step S1253).

FIG. 17 is a diagram illustrating an example of a response to virtual configuration data acquisition request. In step S1252 of FIG. 15, the virtual configuration data acquiring unit 320 sets the setting value of not-notified virtual configuration data to a block 1601 indicated in the virtual configuration data acquisition require shown in FIG. 17.

Returning to FIG. 15, the periphery notification instructing unit 323 determines whether or not the setting value which "not-notified" is set in the notification instruction flag 504 is present with reference to the notification instruction flag 504 included in tenant configuration data (step S1254). When the setting value which "not-notified" is set in the notification instruction flag 504 is absent, the process ends. When the setting value which the "not-notified" is set in the notification instruction flag 504 is present, the periphery notification instructing unit 323 adds the periphery notification instruction to the response to virtual configuration data acquisition request (step S1255). For example, the periphery notification instructing unit 323 sets the periphery notification instruction that instructs the acquisition request source to notify the surrounding image forming apparatus of the setting value set in the block 1601 to the block 1602 indicated in the response to virtual configuration data acquisition request shown in FIG. 17 as the updated setting value.

Next, the periphery notification instructing unit 323 sets "notified" in the notification instruction flag 504 included in tenant configuration data (step S1256). Then the virtual configuration data acquiring unit 320 transmits the response to virtual configuration data acquisition request to the image forming apparatus 101 (step S1257).

Figure 18:
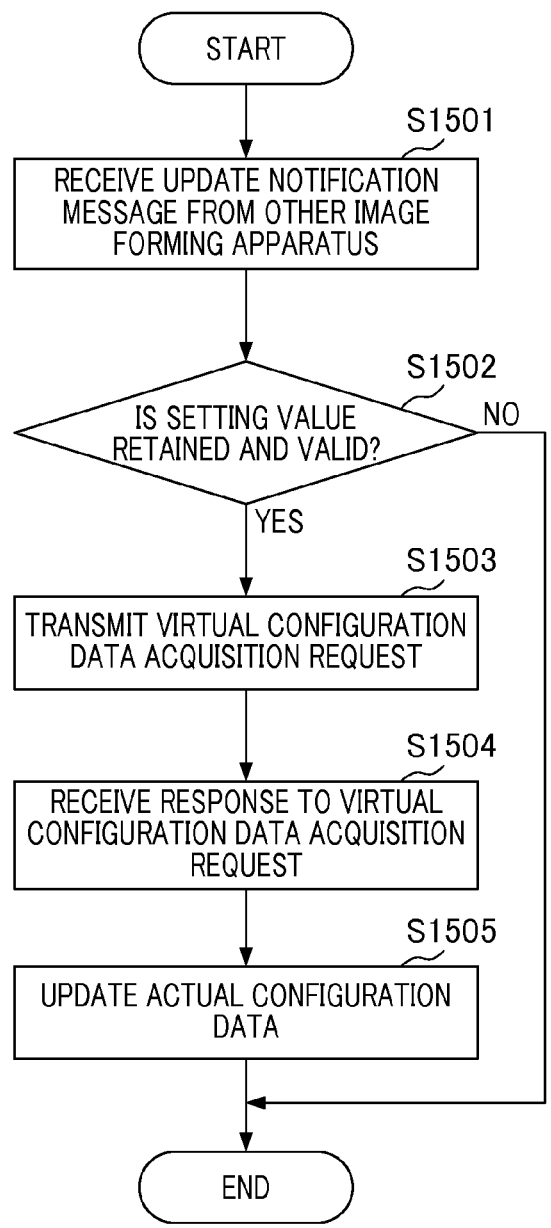
FIG. 18 is an exemplary operation processing by the image forming apparatus that receives a periphery notification instruction.

FIG. 18 is a flowchart describing an exemplary operation processing performed by the image forming apparatus that receives the periphery notification instruction. Each unit that executes these steps is stored in any one of the storage units that are the non-volatile memory, the volatile memory 203A, or the auxiliary storage device 204A, and CPU201A.

Firstly, the notification receiving unit 308 of the image forming apparatus 101 receives an update notification message from other image forming apparatus (step S1501). Subsequently, the notification receiving unit 308 acquires a setting value of configuration data from the received update notification message. Then, the notification receiving unit 308 determines whether or not the acquired setting value is associated with own apparatus, that is, the setting value is retained by own apparatus and valid (step S1502). More specifically, the notification receiving unit 308 determines whether or not the setting value that matches the acquired setting value in step S1501 is present in actual configuration data held by the actual configuration data holding unit 301.

When the setting value that matches the acquired setting value in step S1501 is present in the actual configuration data held by the actual configuration data holding unit 301, the notification receiving unit 308 determines that the own apparatus has the acquired setting value. When the notification receiving unit 308 determines that the own apparatus has the acquired setting value, the notification receiving unit 308 determines whether or not the own apparatus has a device associated with the acquired setting value with reference to actual configuration data (FIGS. 6A to 6C).

When the own apparatus has the device associated with the acquired setting value, the notification receiving unit 308 determines that the acquired setting value is valid in the own apparatus. When the own apparatus does not have the device associated with the acquired setting value, the notification receiving unit 308 determines that the acquired setting value is invalid in the own apparatus. On the other hand, among the setting values of actual configuration data, no setting value matches the acquired setting value in step S1501, the notification receiving unit 308 determines that the own apparatus does not have the acquired setting value.

When the own apparatus has the acquired setting value in step S1501 and the setting value is valid, the process advances to step S1503. When the own apparatus does not have the acquired setting value in step S1501 and the setting value is valid, or the own apparatus has the acquired setting value in step S1501 but the setting value is invalid, the process ends.

For example, it is assumed that the image forming apparatus 101 acquires the setting value "fax_setting.received_print" in step S1503. When actual configuration data of the image forming apparatus 101 is actual configuration data shown in FIG. 4, the image forming apparatus 101 has the setting value. However, when actual device configuration data of the image forming apparatus 101 is actual device configuration data shown in FIG. 6A, the value of the fax unit included in actual device configuration data shown in FIG. 6A indicates "not available". Thus, the setting valued "fax_setting.received_print" is invalid in the image forming apparatus 101.

In step S1503, the notification receiving unit 308 instructs the virtual configuration data receiving unit 303 to transmit the virtual configuration data acquisition request about the own apparatus to the set value management service 310 (step S1503). The set value management service 310 executes processing shown in steps S1251 to 1257 of FIG. 15.

Next, the virtual configuration data receiving unit 303 receives a response to virtual configuration data acquisition request from the set value management service 310 (step S1504). Then the actual configuration data updating unit 302 extracts virtual configuration data from the received response to virtual configuration data acquisition request. Then, the actual configuration data updating unit 302 updates actual configuration data held by the actual configuration data holding unit 301 by replacing it with the extracted actual configuration data (step S1505).

In the information processing system of the first embodiment described above, the set value management service 310 returns the response including the notification instruction that instructs the image forming apparatus to notify the surrounding image forming apparatus that virtual configuration data has been updated in response to the virtual configuration data acquisition request from the image forming apparatus. The image forming apparatus that received the response notifies the surrounding image forming apparatus that virtual configuration data has been updated in response to the notification instruction. Then, the surrounding image forming apparatus that has received the notification acquires virtual configuration data of the own apparatus from the set value management service 310. Therefore, according to the information processing system of the first embodiment, the setting of virtual configuration data (operation setting information) changed on the set value management service can be promptly acquired by each image forming apparatus associated with the setting of target. Also, the information processing system in the first embodiment, the image forming apparatus that needs to change the setting, that is, only the image forming apparatus associated with the setting value of updated virtual configuration data acquires virtual configuration data. In this arrangement, the set value management service can efficiently manage configuration data.

Second Embodiment

In the information processing system of a second embodiment, the set value management service 310 specifies address information of the image forming apparatus associated with operation setting information that is an acquisition request source of virtual configuration data as address information of a transmission destination of the update notification message.

More specifically, the periphery notification instructing unit 323 acquires the device identifier 802 corresponding to the notification flag 806 in which "not-notified" is set with reference to the virtual device shown in FIG. 7. The periphery notification instructing unit 323 specifies an IP address corresponding to the acquired the device identifier 802 based on correspondence information including the device identifier and the IP address of the image forming apparatus having the device identifier that are stored in the storage unit in advance.

The periphery notification instructing unit 323 includes the specified IP address in the periphery notification instruction so as to set it as a response to the virtual configuration data acquisition request. When the image forming apparatus that is the acquisition request source of virtual configuration data receives the response to the virtual configuration data acquisition request, it sequentially transmits the update notification message direct to the IP address included in the periphery notification instruction set in the response to the virtual configuration data acquisition request update via unicast. In this manner, the set value management service 310 can transmit the update notification message to the image forming apparatus associated with the updated setting via the acquisition request source of virtual configuration data even if under an environment such that transfer via multicast is restricted.

In a description below, a description about same points with those in the first embodiment are omitted and thus differences are described. In the second embodiment, in step 1255 of FIG. 15, the periphery notification instructing unit 323 specifies an IP address of the image forming apparatus associated with the setting of the updated virtual configuration data of the image forming apparatus 101. The periphery notification instructing unit 323 sets the periphery notification instruction including the specified IP address in a response to the virtual configuration data acquisition request.

Figure 19:
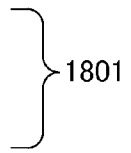
FIG. 19 is diagram illustrating an example of a response to virtual configuration data acquisition request.

FIG. 19 is a diagram illustrating an example of a response to virtual configuration data acquisition request in the second embodiment. As shown in FIG. 19, the periphery notification instructing unit 323 sets the periphery notification instruction including the specified IP address in step 1255 of FIG. 15 in a block 1801 of the response to the virtual configuration data acquisition request.

Also, the image forming apparatus that is the acquisition request source of virtual configuration data 101 that received the response to the virtual configuration data acquisition request from the set value management service 310 executes following processing in step 1205 of FIG. 15. The periphery notifying unit 307 provided in the image forming apparatus 101 sequentially transmits the update notification message direct to the IP address included in the block 1801 shown in FIG. 19 via unicast.

In the first and second embodiments, it is assumed that the server computer group 105 realizes the set value management service 310. However, another structure may be employed. For example, one server computer realizes the set value management service 310. Also, the set value management service 310 may be realized in the user environment 100, the service person environment 110, the vender environment 120 of image forming apparatus, or the like.

In the first and second embodiments, it is assumed that the service person utilizes the terminal device 102B located in the service person environment 110. However, another structure may be employed. For example, a structure in which the service person utilizes terminal device 102A located in the user environment under permission of the user.

Also, the server computers 210A and 210B communicate with each other via the network 220 shown in FIG. 2. However another structure may be employed. For example, the server computers 210A and 210B communicate with each other via the Internet 104.

Also, the actual configuration data holding unit 301 stores actual configuration data in the auxiliary storage device 204A shown in FIG. 3. However another structure may be employed. For example, a structure in which the actual configuration data holding unit 301 temporally stores actual configuration data in the volatile memories 203A may be employed. In this case, since actual configuration data is lost when the power is OFF, the virtual configuration data receiving unit 303 needs to receive virtual configuration data every time the power of the device is ON. As a specific processing, update determination processing in step 1004 is omitted, processing in step 1007 shown in FIG. 10 is always performed.

The actual device configuration data collecting unit 304 shown in FIG. 3 collects actual device configuration data every time the power of the image forming apparatus is ON. However, another structure may be employed. For example, the image forming apparatus may include an actual device configuration data holding unit (not shown) for consistently storing actual device configuration data in the auxiliary storage device 204A. In this case, it is required for promptly rewriting device configuration data held by the actual device configuration data holding unit depending on the change of actual device configuration data. Thus, the actual device configuration data collecting unit 304 monitors the change of actual device configuration data, notifies the actual device configuration data holding unit of the changed content, and reflects the changed content on actual device configuration data when the actual device configuration data collecting unit 304 detects the changed contents. Also, the actual device configuration data notification unit 306 requests actual device configuration data to the actual device configuration data holding unit.

The tenant identifier holding unit 305 shown in FIG. 3 stores the tenant identifier in the tenant identifier auxiliary storage device 204A. However another structure may be employed. For example, a structure in which a user inputs the tenant identifier by using the input device 206A every time may be employed. The timing of the input may be upon activation of the image forming apparatus, or another timing may be available. In this case, the tenant identifier is stored in the volatile memories 203A.

The actual device configuration data notification unit 306 shown in FIG. 3 performs processing when the power of the image forming apparatus is ON. However, another structure may be employed. For example, a structure in which the user instructs acquisition of virtual configuration data by using the input device 206A may be employed. In this case, subsequent processing of step 1002 is performed when the image forming apparatus detects the acquisition instruction of virtual configuration data in step 1001 shown in FIG. 14.

The virtual device holding unit 311 shown in FIG. 3 holds the identifier as shown in FIG. 7 for identifying virtual device configuration data and virtual configuration data. However, another structure may be employed. For example, a structure in which the virtual device holding unit 311 holds substance of data other than the identifier may be employed.

The virtual configuration data generating unit 316 shown in FIG. 3 generates virtual configuration data based on the model setting value schema, tenant configuration data, and virtual device configuration data. However, another structure may be employed. For example, the virtual configuration data generating unit 316 generates virtual configuration data depending on the model based on the model setting value schema and tenant configuration data. In this case, the image forming apparatus refers to actual configuration data depending on device configuration when referring to actual configuration data. Also, a structure in which the virtual configuration data generating unit 316 generates virtual configuration data with additional predetermined license data may be employed. In this case, virtual configuration data accommodated with optional functions provided in the image forming apparatus is generated.

Also, in step 1004 of FIG. 14, the image forming apparatus 101 may confirm whether or not virtual configuration data associated with the own apparatus has been updated, and make a virtual configuration data request even if the setting associated with the own apparatus has not been updated. The set value management service 310 returns a response in which the periphery notification instruction including the setting value indicating the notification instruction flag "not-notified" is set among the setting values of tenant configuration data. In this manner, the operability of which the updated setting is more promptly reflected on other image forming apparatus is improved.

In aforementioned description, in step 1256 of FIG. 15, the periphery notification instructing unit 323 includes the periphery notification instruction in the response, and then sets "notified" in the notification instruction flag corresponding to the setting value of tenant configuration data. In alternatively embodiment, the periphery notification instructing unit 323 may have a timer monitoring function. More specifically, when the image forming apparatus that needs to acquire virtual configuration data within a predetermined period after the response to the virtual configuration data acquisition request is returned, the periphery notification instructing unit 323 performs following processing.

The periphery notification instructing unit 323 resets "not-notified" in the notification instruction flag 504. In this manner, the periphery notification instructing unit 323 can instructs the image forming apparatus that acquires configuration data next to retransmit the update notification message to other image forming apparatus. The image forming apparatus that needs to acquire virtual configuration data is an image forming apparatus associated with the setting value which "notified" is set in the notification instruction flag, that is, an image forming apparatus which "not-notified" is set in the notification instruction flag of the virtual device.

Also, in step S1502 of FIG. 18, the image forming apparatus 101 promptly acquires virtual configuration data when the own apparatus has configuration data included in the update notification message, and the setting value is valid. In alternatively embodiment, the image forming apparatus 101 may change timing for acquiring virtual configuration data. When the image forming apparatus 101 determines that the own apparatus has the configuration data and the setting value is valid, the image forming apparatus 101 may acquire the virtual configuration data after a random time elapsed or at the time the setting affects in the actual operation. In this manner, a load to the set value management service 310 prevents from being concentrated.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-279337 filed Dec. 21, 2011, which is hereby incorporated by reference herein in its entirety.

What is claimed is:

1. An information processing system comprising:
an image forming apparatus; and
a management device that manages operation setting information for switching the operation of an image forming apparatus,
wherein the management device comprises:
    an updating unit configured to update the operation setting information of the image forming apparatus;
    a transmitting unit configured to receive an acquisition request of the updated operation setting information of the image forming apparatus from the image forming apparatus, and transmit the updated operation setting information of the image forming apparatus to the image forming apparatus; and
    a notification instructing unit configured to instruct the image forming apparatus that is an acquisition request source of the operation setting information to notify other image forming apparatus different from the acquisition request source that the operation setting information has been updated, and
wherein the image forming apparatus comprises:
    a requesting unit configured to transmit an acquisition request of the updated operation setting information of the own apparatus to the management device, and receive the updated operation setting information and the notification instruction from the management device as a response to the acquisition request of the operation setting information;

a notifying unit configured to notify the other image forming apparatus of an update notification indicating that the operation setting information has been updated according to the received notification instruction; and a receiving unit configured to receive the update notification from the other image forming apparatus, wherein, when the update notification is received by the receiving unit, the requesting unit further transmits the acquisition request of the operation setting information of the own apparatus to the management device if a setting that matches a setting shown by the received update notification is retained by the own apparatus and the retained setting is valid.

2. The information processing system according to claim 1, wherein the image forming apparatus further comprises:

an analyzing unit configured to analyze an update content of the operation setting information indicated by the update notification received by the receiving unit, determine whether or not a setting associated with the own apparatus has been updated based on the analysis result, and instruct the requesting unit to transmit the acquisition request of the operation setting information of the own apparatus when it is determined that the setting associated with the own apparatus has been updated.

3. The information processing system according to claim 1, wherein the notification instructing unit transmits the notification instruction via broadcast or multicast.

4. The information processing system according to claim 1, wherein the notification instructing unit specifies address information of the image forming apparatus associated with the setting of the updated operation setting information as address information of a destination image forming apparatus of the update notification, and includes the specified address information of the destination image forming apparatus in the notification instruction, and wherein the notifying unit transmits the update notification to the image forming apparatus corresponding to the address information included in the notification instruction via unicast.

5. A management device for managing operation setting information for switching the operation of an image forming apparatus, the management device comprising:

an updating unit configured to update the operation setting information of the image forming apparatus;

a transmitting unit configured to receive an acquisition request of the updated operation setting information of the image forming apparatus from the image forming apparatus, if a setting that matches a setting shown by a received update notification is retained by the image forming apparatus and the retained setting is valid, and transmit the updated operation setting information of the image forming apparatus to the image forming apparatus; and a notification instructing unit configured to instruct the image forming apparatus that is an acquisition request source of the operation setting information to notify other image forming apparatus different from the acquisition request source that the operation setting information has been updated.

6. A management method in an information processing system comprising image forming apparatus and a management device for switching an operation of an image forming apparatus, the method comprising:

updating, by the management device, operation setting information of the image forming apparatus;

transmitting, by the image forming apparatus, an acquisition request of the updated operation setting information of the own apparatus to the management device;

receiving, by the management device, acquisition request of the updated operation setting information of the image forming apparatus from the image forming apparatus, and transmitting the updated operation setting information of the image forming apparatus to the image forming apparatus;

notifying, by the management device, other image forming apparatus of an update notification indicating that the operation setting information has been updated according to the received notification instruction;

receiving, by the image forming apparatus, the updated operation setting information and the received notification instruction from the management device as a response to the acquisition request of the operation setting information;

notifying, by the image forming apparatus, the other image forming apparatus of an update notification indicating that the operation setting information has been updated in response to the received notification instruction;

receiving, by the other image forming apparatus, the update notification; and transmitting, when the update notification is received in the receiving, by the image forming apparatus, the acquisition request of the operation setting information of the own apparatus to the management device if a setting that matches a setting shown by the received update notification is retained by the own apparatus and the retained setting is valid.

7. A non-transitory storage medium on which is stored a computer program for making a computer execute a management method in an information processing system comprising an image forming apparatus and a management device for switching the operation of an image forming apparatus, the method comprising:

updating, by the management device, an operation setting information of the image forming apparatus;

transmitting, by the image forming apparatus, an acquisition request of the updated operation setting information of the own apparatus to the management device;

receiving, by the management device, acquisition request of the updated operation setting information of the image forming apparatus from the image forming apparatus, and transmitting the updated operation setting information of the image forming apparatus to the image forming apparatus;

notifying, by the management device, other image forming apparatus of an update notification indicating that the operation setting information has been updated in response to the received notification instruction;

receiving, by the image forming apparatus, the updated operation setting information and the received notification instruction from the management device as a response to the acquisition request of the operation setting information;

notifying, by the image forming apparatus, the other image forming apparatus of an update notification indicating that the operation setting information has been updated according to the received notification instruction;

receiving, by the other image forming apparatus, the update notification; and transmitting, when the update notification is received in the receiving, by the image forming apparatus, the acquisition request of the operation setting information of the own apparatus to the management device if a setting that matches a setting shown by the received update notification is retained by the own apparatus and the retained setting is valid.

* * * * *